Apr. 24, 1923.

W. S. JOHNSON ET AL 1,452,512

ELECTRIC RIVET HEATER

Filed Oct. 12, 1920

INVENTOR
W. S. Johnson
BY W. Sheffer
F. H. Gibbs
ATTORNEYS

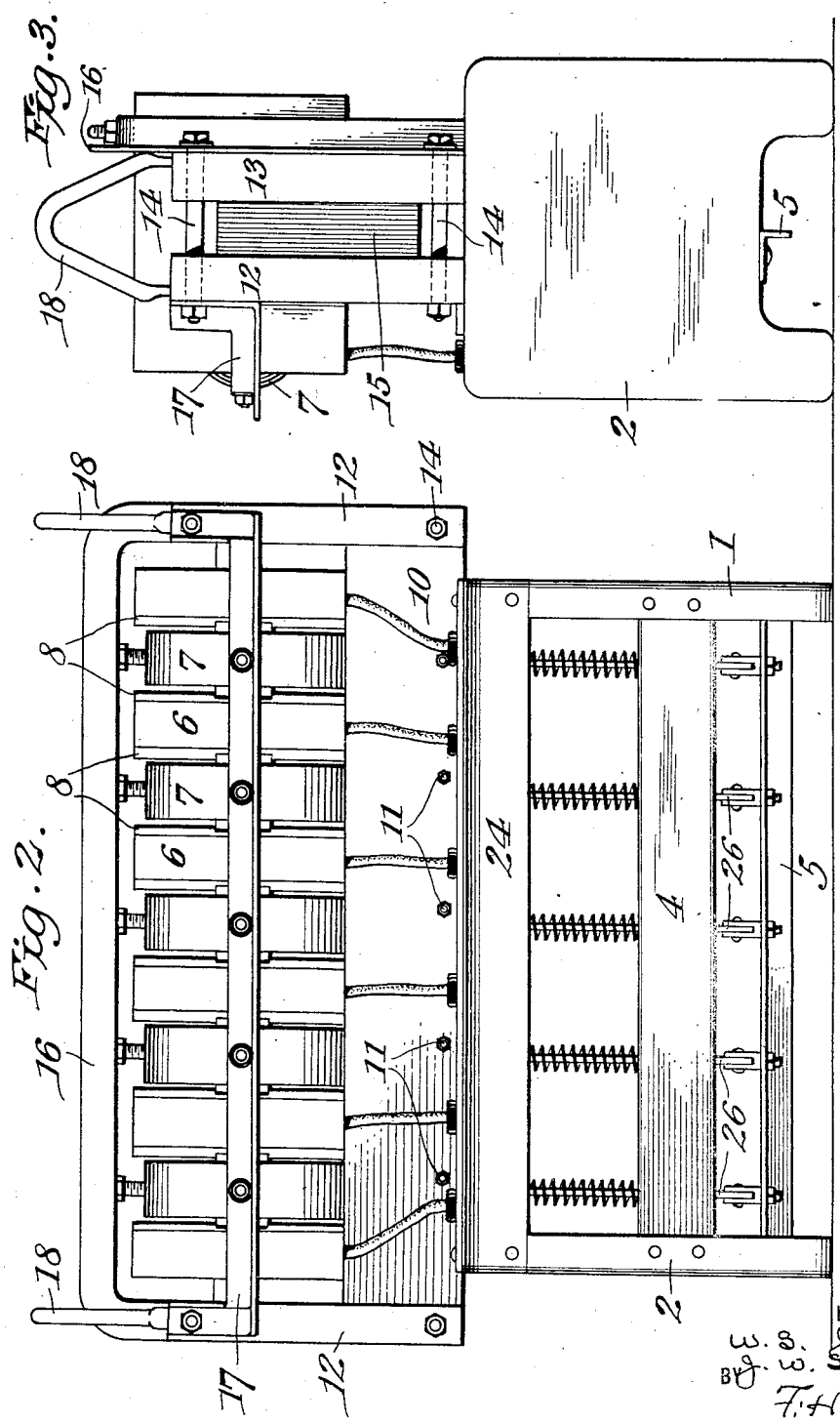

Patented Apr. 24, 1923.

1,452,512

UNITED STATES PATENT OFFICE.

WILLIAM S. JOHNSON AND JOHN W. SHEFFER, OF BERWICK, PENNSYLVANIA, ASSIGNORS TO AMERICAN CAR AND FOUNDRY COMPANY, OF ST. LOUIS, MISSOURI, A CORPORATION OF NEW JERSEY.

ELECTRIC RIVET HEATER.

Application filed October 12, 1920. Serial No. 416,395.

*To all whom it may concern:*

Be it known that we, WILLIAM S. JOHNSON and JOHN W. SHEFFER, residing at Berwick, Columbia County, Pennsylvania, and being citizens of the United States, have invented certain new and useful Improvements in an Electric Rivet Heater, of which the following is a full, clear, and exact description, such as will enable others skilled in the art to which it appertains to make and to use the same, reference being had to the accompanying drawings, which illustrate the preferred form of the invention; though it is to be understood that the invention is not limited to the exact details of construction shown and described, as it is obvious that various modifications thereof within the scope of the claims will occur to persons skilled in the art.

In said drawings—

Figure 2 is a view in rear elevation; and

Figure 3 is a view in end elevation.

Figure 1:
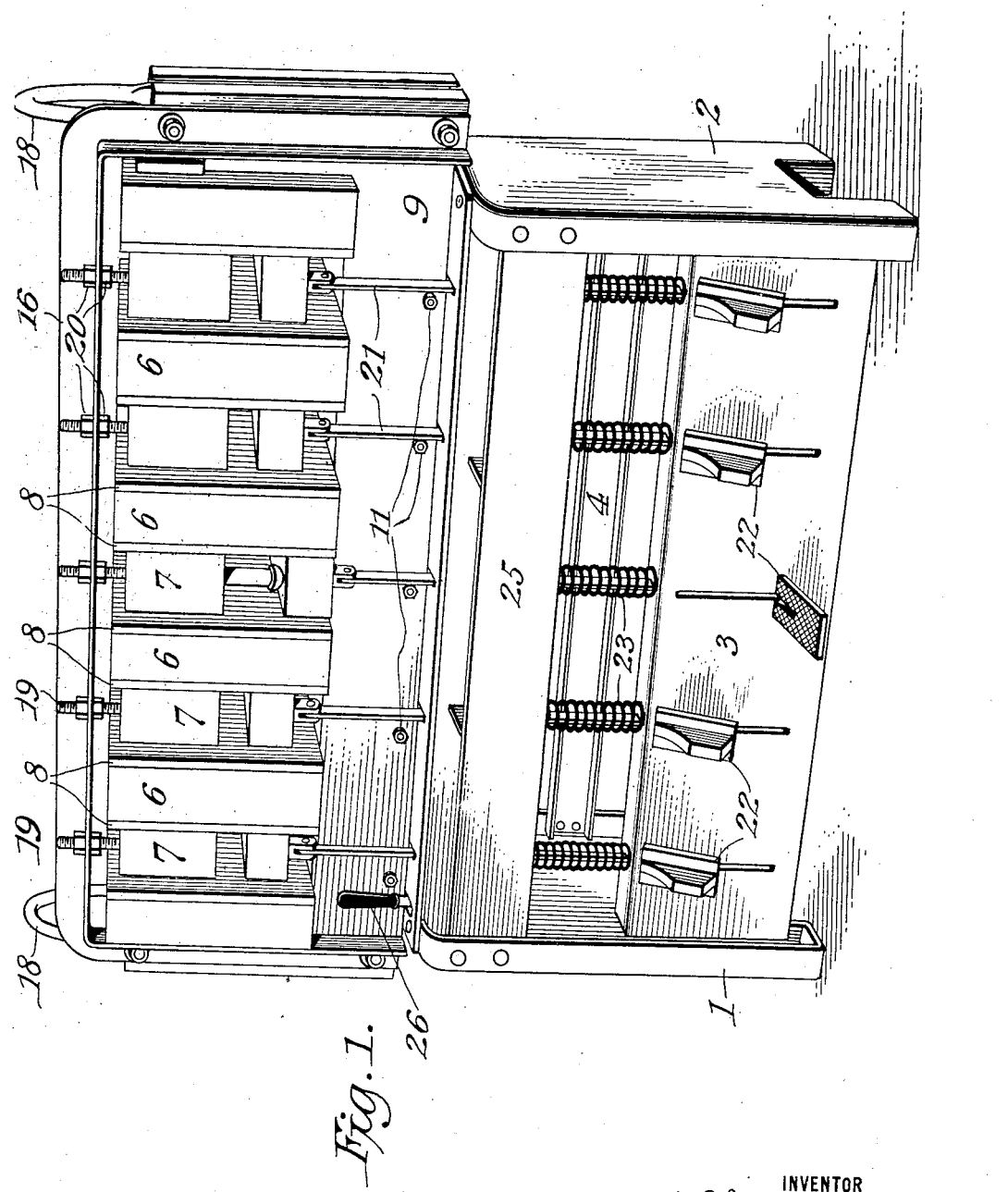
Figure 1 is a view in perspective of our improved electric rivet heater.

It is the object of our invention to provide an improved electric rivet heater having a metal frame composed of standard metal shapes and pressed sheet metal members and of such a construction that all parts of the heater will be within the outline of the frame members and be protected thereby thus providing a heater that may be moved about or handled by means of a crane or hoist with a minimum of damage to the operating parts and coil insulation.

The frame comprises sheet metal end members or uprights 1 and 2 pressed so as to provide an inwardly extending flange on each upright and secured together by the pressed metal members 3, 4 and the angle bar 5 riveted or otherwise secured to the members 1 and 2.

The rectangular laminated sheet iron core 15 upon which are mounted the primary coils 6 secondary coils 7 and separators 8 is held between the core retaining members comprising angle bars 9 and 10 which are held, so as to press the core laminations tightly together, by the bolts 11 which pass beneath the core and through the vertically extending flanges of the members 9 and 10. The horizontally extending flanges of these members rest upon and are secured to the inwardly extending flanges of the end members 1 and 2. The ends of the core 15 are confined between angle bar members 12 and 13 which receive the core in the angle between the flanges and extend above and below the core so as to receive the bolts 14 which serve to hold the angle bar members 12 and 13 against the core 15 and to join to the members 13 and 14 the angle bar members 16 and 17 and the chain hooks 18. The lower bolts 14 also join the members 12 and 13 and the chain hooks 18 to the core retaining members 9 and 10.

The angle bar member 16 is shaped as an inverted U and, extending over the core from end to end, serves as a support for the secondary coils 7, the upper terminals of which are adjustably connected to the member 16 by means of the screw threaded rods 19. The rods 19 are screwed into the terminal blocks of the secondary coils and pass freely through openings in a flange of the member 16 and are engaged by the nuts 20 on each side of the flange. The member 17 is bent to a U-shape and has the end portions of its sides bent at right angles to the sides so that the end portions will be flat against the members 12 and the member 17 will extend from end to end of the heater across the back and serve to support the secondary coils which are adjustably connected by bolts and nuts to the member 17.

To operate the lower electrodes, rods 21 are pivotally connected to the bottoms of the electrodes. The rods 21 pass through slots in the horizontal flanges of the members 3 and 9 and are pivotally connected to levers 26 that are pivotally mounted on the angle bar connecting member 5 and project through slots in the face of pressed connecting member 3. The outer ends of the levers 26 are provided with pivoted pedals 22 that may be folded in so as to rest against the face of member 3 and be within the outline of the end members 1 and 2. Springs 23 surround the rods 21 and are confined between the upper flange of the member 3 and projections secured to the rods 21.

Secured to the flanges of end members 1 and 2 and conforming to the shape of the corners of the end members is the cover member 24 which is provided with openings having insulating bushings through which are lead the conductors connected to the primary coils. The member 24 also aids in uniting the end members 1 and 2 and protects the conductors leading from the control switch to the coils. Secured to the inwardly disposed flanges of the end members is the trough-shaped rivet receptacle 25, mounted within and being secured to the flanges of said end members and cooperating with said end members to form the trough.

Projecting through a slot at one end of the horizontal flange of the member 9 is the handle 26 of the main control switch that is mounted on the end member 1 beneath the member 9 where it is fully protected and yet convenient to the operator.

What we claim is:

1. In an electric rivet heater, a frame comprising spaced pressed metal end members, core retaining members connecting said end members and a coil supporting member connecting the ends of said core retaining members.

2. In an electric rivet heater, a frame comprising flanged end members, core retaining members connecting said flanges and angularly disposed coil supporting members carried by said core retaining members.

3. In an electric rivet heater, a frame comprising flanged end members, connecting members secured to said flanges, core retaining members connecting said end members and coil supporting members and chain hooks carried by said core retaining members.

4. In an electric rivet heater, a frame comprising spaced end members, core retaining members connecting said end members, a rivet trough joining said end members and a U-shaped coil supporting member connecting the ends of said core retaining members.

5. In an electric rivet heater, a frame comprising end members and a rivet trough connecting said end members and having its ends formed by said end members.

6. In an electric rivet heater, a frame comprising end members and a core retaining member connecting said end members and having openings for the electrode operating rods.

In witness whereof we have hereunto set our hands in the presence of two witnesses.

WILLIAM S. JOHNSON.
JOHN W. SHEFFER.

Witnesses:
H. R. WILLIAMS,
FRED R. LONG.